March 8, 1960 R. T. BURNETT 2,927,663
BRAKE
Filed May 7, 1954 2 Sheets-Sheet 1

INVENTOR.
RICHARD T. BURNETT
BY Cecil F. Arens
ATTORNEY

INVENTOR.
RICHARD T. BURNETT
BY
ATTORNEY

United States Patent Office 2,927,663
Patented Mar. 8, 1960

2,927,663

BRAKE

Richard T. Burnett, South Bend, Ind., assignor to Bendix Aviation Corporation, South Bend, Ind., a corporation of Delaware Application May 7, 1954, Serial No. 428,343

13 Claims. (Cl. 188—70)

This invention relates to a brake having either or both of the following attributes: engagement of one friction means is brought about as the result of the engagement of another friction means and/or a plurality of rotor surfaces are engaged by friction means associated with a single stator unit.

An important object of this invention is to combine in a single brake assembly the best operating features of disk and drum (or shoe) brakes, obtaining the self-energization inherent in certain types of drum brakes, while avoiding the loss of pedal travel which results from drum expansion in conventional drum brakes.

Another important object of this invention is to obtain improved heat dissipation from the brake elements, with a consequent significant reduction of "fade" (i.e. loss of brake effectiveness). This is accomplished primarily as a result of an appreciable increase in the swept rotor area, obtained by utilizing both disk and cylindrical friction areas.

Among the other advantages obtained by using the present invention are: (a) increase of pedal ratio or decrease of pedal stroke made possible by reduced fluid displacement in the hydraulic actuator; and (b) economical realization of the foregoing objects and advantages by means of a simple low-cost construction.

The braking art has utilized among others two distinct types of brakes—the "drum" (or "shoe") and the "disk" brake. Each of these distinct types has characteristic advantages which have determined the particular type used in a given instance. But the choice of one of these types of brake is usually at the cost of foregoing the advantages of the other. Generally, the desirable characteristics of the disk brake are: low pedal travel loss during the brake application; better heat dissipation with resultant reduction of the tendency to "fade"; and simplification of the brake adjustment mechanism. On the other hand, the drum brake has the advantage of being able to provide greater self-energization, and therefore increased torque absorption. While this is a very generalized listing of the broad characteristics of the two different types of brakes it will be sufficient to emphasize the desirability of having the advantage of both braking characteristics in a single unit such as has been accomplished in the present invention. In addition part of the improvement of my brake operation stems from using a greater swept rotor area, that is, the area of the rotating member contacted by friction elements is increased by using both cylindrical and disk surfaces of the same rotor.

In obtaining the objects of this invention, it is my aim to provide a pivotally mounted disk brake element which is detachedly associated with a second brake element consisting of a pair of arcuate brake shoes. It is my purpose to apply the shoes by the torque reaction developed from application of the disk elements which are mounted independently of the articulated brake shoes.

The above and other objects and features of the invention will appear more fully hereinafter from a consideration of the following description, taken in connection with the accompanying drawings, wherein an embodiment of the invention is illustrated by way of example.

Figure 4:
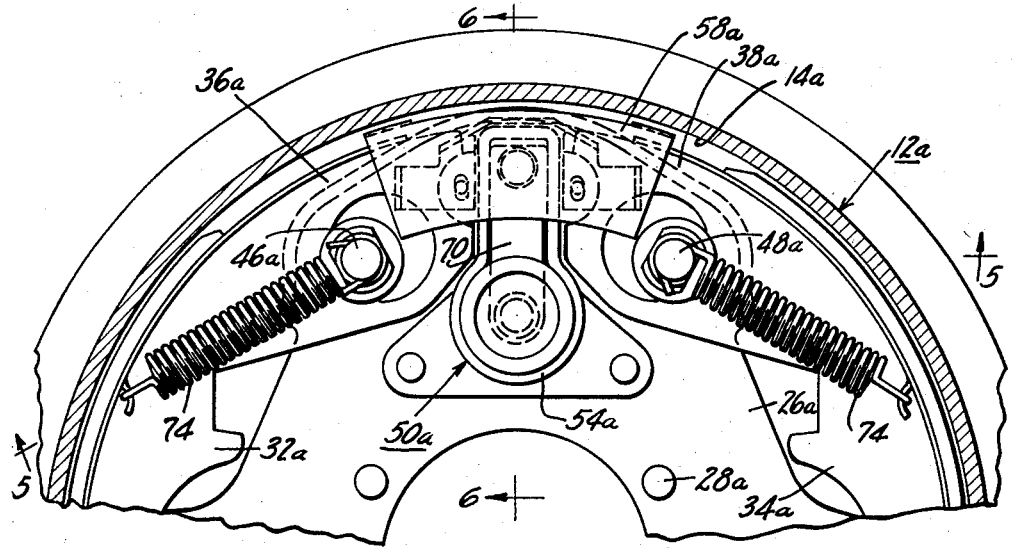
Figure 5:
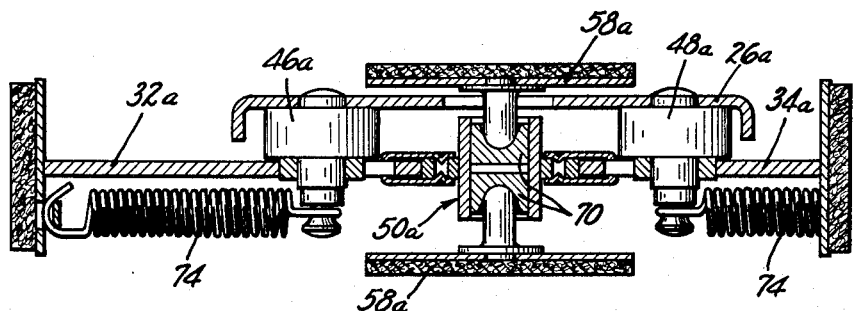
Figure 6:
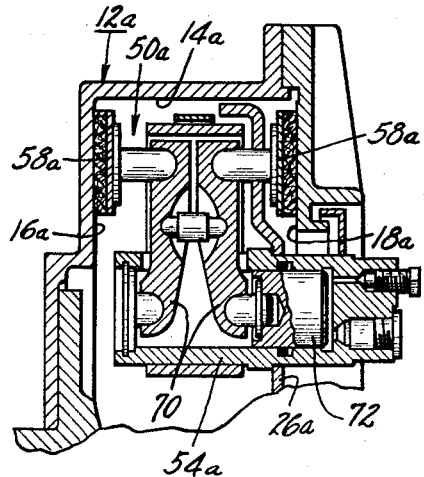

Figure 4 is a fragmentary view of a brake assembly constituting a further embodiment of the invention; and Figures 5 and 6 are section views taken on the lines 5—5 and 6—6 of Figure 4.

Figure 1:
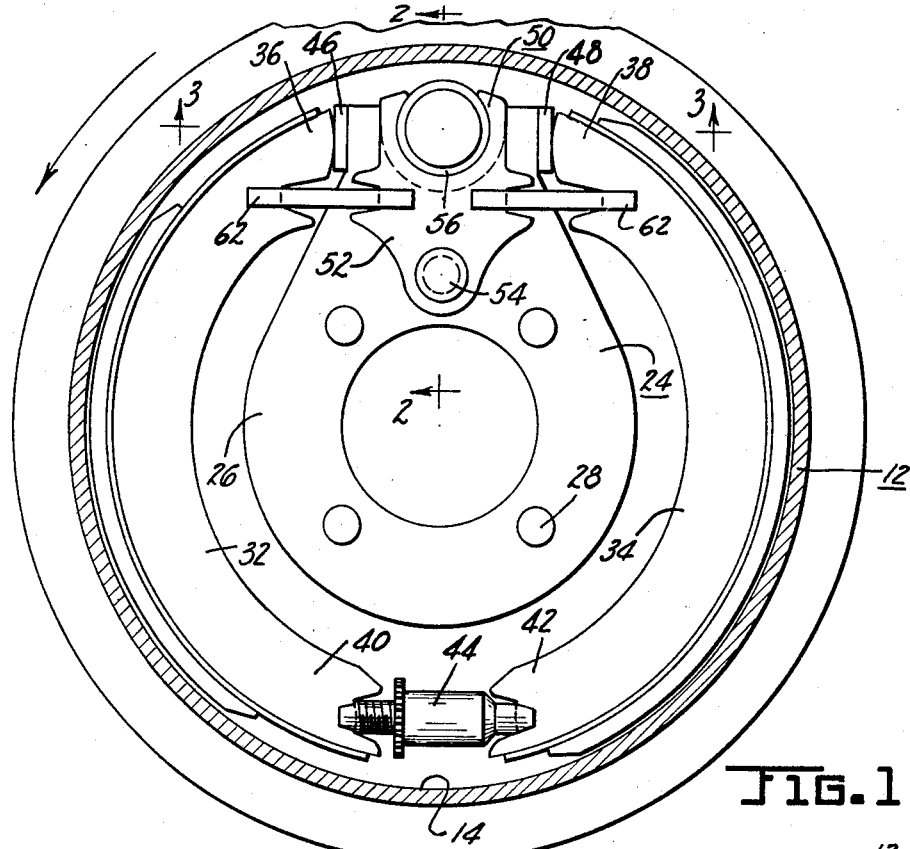
Figure 1 is a side elevation of a brake mechanism which embodies my invention.
Figures 2, 3:
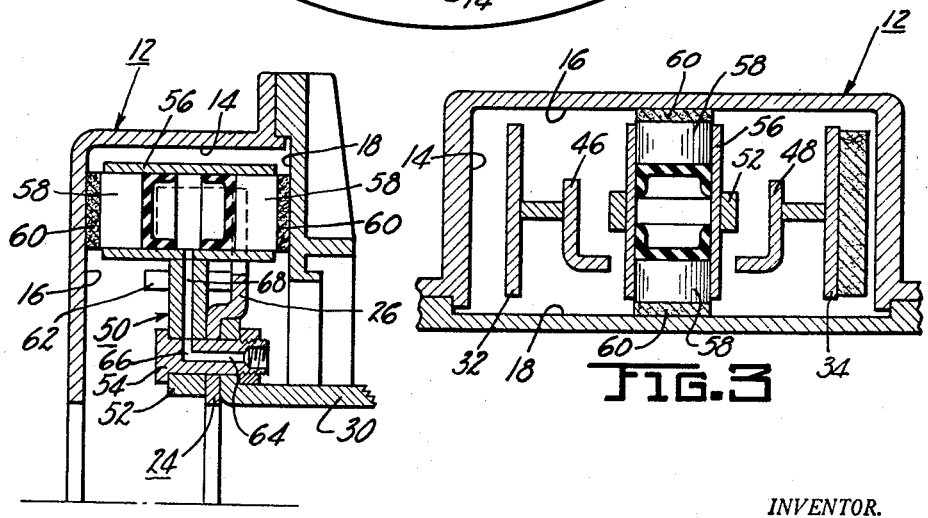
Figure 2 is a section view of the brake assembly taken on the line 2—2 of Figure 1.
Figure 3 is a fragmentary section view taken on the line 3—3 of Figure 1.

The brake assembly illustrated in Figures 1 to 3 includes a rotor 12, having three friction element engaging surfaces 14, 16, and 18. The rotor 12 is suitably secured by a plurality of fastening members, not shown, to a rotatable part of the brake assembly such as a hub (not shown). Stator 24 includes a torque-taking member 26 suitably secured by fastening devices 28 to a fixed part of the brake assembly such as spindle 30.

The brake assembly is equipped with two, arcuate, friction material lined shoes 32 and 34 having adjacent expansible ends 36 and 38, and articulated ends 40 and 42, with an adjustable strut 44 therebetween. The two shoes 32 and 34 are adapted to anchor alternatively at either adjacent expansible end 36 or 38 on anchors 46 and 48 respectively.

For actuating the shoes 32 and 34 I provide a novel applying means 50 comprising a carrier member 52 pivotally mounted on torque-taking member 26 by an anchor pin 54, a cylinder 56 transversely received in carrier member 52, and a pair of oppositely acting pistons 58 having friction material facing 60. Struts 62 operatively interconnect adjacent shoe ends 36 and 38 with the carrier member 52.

As best seen in Figure 2, anchor pin 54 is adapted to form a part of the hydraulic system actuating the brake. A centrally located longitudinal bore 64 intersects radial bore 66 communicating with a conduit 68. The conduit 68 leads to the cylinder 56, transmitting hydraulic fluid pressure to the oppositely acting pistons reciprocably mounted therein.

To apply the brake, fluid pressure is generated in a master cylinder source (not shown) and introduced through the passage 64 in the anchor pin 54 and the conduit 68 to the cylinder 56 where it spreads apart the oppositely-acting pistons 58, bringing lining 60 into frictional engagement with the disk surfaces 18 and 16 of the rotor 12.

Assuming counterclockwise direction of rotor rotation, indicated by the arrow in Figure 1, engagement of the facing 60 with the disk surfaces of the rotor will cause a counterclockwise actuation of member 52 about anchor pin 54 to apply the shoe end 36 of brake shoe 32 through the strut 62, thereby engaging the friction material lined rim of arcuate brake shoe 32 with the surface 14 of the rotor 12. Brake shoe 32 applies shoe 34 through the adjustable strut 44. The two shoes 32 and 34 anchor as a unit on anchor 48.

With opposite direction of rotor rotation, engagement of the friction material lined pistons 58 with sides 18 and 16 of rotor causes clockwise actuation of membei 52 about the anchor pin 54 to apply end 38 of brake shoe 35 through the strut 62. The shoe 34 is thus forcibly engaged with surface 14 of the rotor. Brake shoe 34 applies brake shoe 32 through the strut 44; the two shoes anchor as a unit at shoe end 36 against anchor 46.

Clearance is provided between the struts 62 and the carrier member 52 so that the anchoring load of the two shoes is taken by anchors 46 and 48 and none of the anchoring force is transmitted through the strut to member 52.

Referring to Figure 1, it will be noted that the applying force on the shoes which is exerted by the reaction from engagement of the lining on the pistons is multiplied through the lever arrangement of member 52.

Turning now to the second embodiment, shown in Figures 4 to 6, parts of the brake assembly corresponding to those previously described will be designated by the same reference numeral with the subscript "a."

A rotor 12a is provided with three friction element engaging surfaces, disk surfaces 16a and 18a, and cylindrical surface 14a.

Pivotally mounted on torque-taking member 26a is an applying means 50a comprising two axially movable friction elements 58a engageable with the disk surfaces 18a and 16a. The elements 58a are spread apart by levers 70 which are actuated by a fluid motor 72. Referring to Figure 6, the piston in the fluid motor 72 is urged leftwardly when fluid pressure is admitted to the fluid motor causing the two levers 70 to pivot on the pin midway between the ends of the levers thereby causing the ends of the levers 70 remote from the fluid motor actuator to be spread apart. The ends of levers 70 combined with the elements 58a thereby forcibly engage the elements 58a with the spaced disk surfaces 16a and 18a of rotor 12a.

Engagement of the elements 58a with the disk surfaces 16a and 18a causes the applying means to pivot on anchor pin 54a whereupon applying effort is exerted on one of the adjacent expansible ends 36a or 38a of the shoes 32a and 34a. The shoes are forcibly engaged against surface 14a of the rotor 12a and both shoes anchor together on either anchor 46a or 48a, depending upon the direction of motion of the rotor to be impeded.

Return springs 74 are fastened between the ends of the shoes and the anchors to retain the shoes in an off position when the brake is released.

From a consideration of the operation of the devices it is apparent that I have achieved the enumerated objects of the invention by utilizing two distinct friction-producing elements. By making disk brake elements the operator-controlled portion of the brake, I have substantially eliminated pedal travel loss due to drum expansion. Also, only a small initial effort or input force need be applied for actuating the brake. At the same time, I utilize shoe braking and therefore obtain a preferred degree of self-energization which is inherent in this design. Certain of my improved results stem from separating direct interrelation of the actuated brake shoes and applying means. That is, the torque reaction from application of the disk brake elements is utilized as the applying force on the brake shoes. Since the braking effort is dissipated over a wide swept rotor area I realize more efficient heat dissiptation, thus reducing operating temperatures and minimizing attendant thermal effects on the braking operation.

Although only two selected embodiments of the invention have been illustrated and described, various changes in the form and relative arrangements of the parts may be made to suit requirements without departing from the principles of the invention.

I claim:

1. A brake comprising a single U-shaped cross-section rotor, a fixed support plate, an actuator pivotal on an axis parallel to the axis of rotation of said rotor, a cylinder mounted in said actuator with its axis parallel to the pivotal axis of said actuator and located radially between the axis of rotation of said rotor and the outer periphery of said rotor, a pair of oppositely-acting pistons reciprocably received in said cylinder, oppositely-facing parallel friction elements actuatable by said pistons to cause pivotal movement of said actuator by engagement of said elements with spaced sides of said rotor, a pair of self-energizing brake shoes articulated at one pair of ends and spreadable at their other ends, means for mounting said actuator to provide pivotal actuator movement between the ends of said brake shoes, a pair of struts operatively interconnecting the spreadable ends of said shoes and said actuator to communicate pivotal movement of said actuator as applying effort on said shoes to apply said shoes radially outwardly into engagement with the cylindrical surface of said rotor, and anchoring means associated with each of the spreadable ends of said shoes.

2. A brake comprising a single rotatable member having three friction-element-engaging surfaces two of which are axially-spaced apart with the third forming a cylindrical surface, a fixed torque-taking member, means pivotally associated with said torque-taking member, a cylinder transversely mounted within said means with its axis parallel to the pivotal axis of said means and located radially between the axis of rotation of said rotor and the outer periphery thereof, oppositely-acting pistons reciprocably received in said cylinder, oppositely-facing parallel friction elements actuatable by said pistons into engagement with the axially-spaced sides of said rotatable member to produce pivotal movement of said means, a pair of T-section radially outwardly actuated self-energizing brake shoes arranged in end-to-end relationship and anchored on said torque-taking member, force transmitting members located radially between the pivotal axis of said means and said friction elements to interconnect said means with one pair of ends of said shoes, pivotal movement of said means being transmitted through said force transmitting members to apply said shoes against the cylindrical surface of said rotatable member, and means transmitting the anchoring load of said shoes to said torque-taking member.

3. In a brake, the combination comprising a single rotatable member having two axially-spaced disk surfaces joined by a substantially cylindrical surface, a pair of articulated self-energizing brake shoes which are engageable with a cylindrical surface of said rotatable member during braking in each direction of rotation of said rotatable member, a torque-taking member, actuator means for applying said shoes against the substantially cylindrical surface of said rotatable member, means for mounting said actuator means between the ends of said brake shoes, said actuator means being pivotally associated with said torque-taking member and including axially reciprocable oppositely-facing parallel friction elements located radially intermediate said actuator mounting means and the cylindrical surface of said rotatable member engageable with the disk surfaces of said rotatable member to produce pivotal actuation of said means, a force transmitting member which communicates the pivotal movement of said means as an applying force on said shoes, and means for transmitting the anchoring load of both said shoes and said friction elements to said torque-taking member.

4. A brake comprising a pair of articulated self-energizing T-section brake shoes adapted to anchor at either of the adjacent spreadable ends thereof, a torque-taking member for receiving the anchoring thrust of said shoes, actuator means pivotally combined with said torque-taking member for applying said shoes, and means for mounting said actuator means for pivotal movement between the ends of said articulated brake shoes said actuator means including oppositely-facing parallel friction elements having their friction surfaces located in substantially parallel planes perpendicular to the friction surfaces of said brake shoes.

5. In combination with a single rotatable member, a brake comprising anchoring means, a pair of arcuate self-energizing brake shoes pivotally movable on said anchoring means interiorly of said rotatable member and engageable with said rotatable member, friction producing elements disposed between said brake shoes, and means for mounting said friction producing elements for pivotal movement thereof on a pivot axis located radially between the axis of rotation of said rotatable member and said friction producing elements, said elements having oppositely-facing parallel friction surfaces located in planes perpendicular to the engageable surfaces of said brake shoes and engageable with said rotatable member to develop torque for applying said shoes during engagement of said friction producing elements with the rotatable member in either direction of rotation of said rotatable member.

6. In combination with a single rotatable member, a brake comprising a support member, at least one radially outwardly movable self-energizing brake shoe engageable with said rotatable member, a pair of oppositely-actuated disk brake elements having oppositely-facing parallel friction surfaces engageable under equal applying force with said rotatable member to develop torque reaction in each direction of rotation of said rotatable member utilizable for applying said brake shoe against said rotatable member and means for mounting said disk brake elements within said rotatable member to provide pivotal movement of said disk brake elements at the end of said brake shoe, said disk brake elements being detachably associated with said brake shoe to permit independent pivotal movement of said disk brake elements and said brake shoe.

7. In a kinetic energy absorbing device, a rotatable member, a support member, a pair of self-energizing brake shoes floatably arranged on said support member for radially outward movement into frictional engagement with said rotatable member, said shoes being arranged in end-to-end relationship with one pair of their ends interconnected and the other of their ends spreadable, an anchor carried by said support member and associated with each of the adjacent spreadable ends of said shoes, both shoes anchoring on one of said anchors during braking in one direction of rotation and on the other anchor for the opposite direction of rotation, oppositely-acting axially-movable shoe applying means located radially between the axis of rotation of said rotatable member and the outer periphery thereof, said shoe applying means being interconnected with each brake shoe, said means including oppositely-facing parallel friction elements engageable with the rotatable member, and means for mounting said shoe applying means for pivotal movement between the brake shoe ends on a pivot axis located between the axis of rotation of said rotatable member and said friction elements.

8. In a brake, a single rotatable member having a plurality of substantially flat circular surfaces and a cylindrical surface, pivotally mounted friction producing means including oppositely-facing parallel friction elements movable into frictional engagement with the substantially flat circular surfaces of said rotatable member to cause said means to pivot, a pair of self-energizing brake shoes floatably arranged for radially outward movement into engagement with the cylindrical surface of said member, two fixed anchors one for each shoe, connecting means between said friction producing means and said shoes to transmit an applying force on said shoes developed from the pivotal action of said means relatively to said shoes, and means for mounting said friction producing means between adjacent expansible ends of said brake shoes to provide pivotal movement of said friction producing means on a pivotal axis located radially between said friction producing means and the axis of rotation of said rotatable member.

9. In combination with a single rotatable member having two substantially flat spaced-apart annular surfaces joined by a cylindrical braking surface, a kinetic energy absorbing device comprising a pivoted carrier member, two oppositely-facing parallel friction elements engageable with the substantially flat spaced-apart annular surfaces of said rotatable member and operatively connected with said carrier to develop torque utilizable for causing said carrier to pivot, a floatable self-energizing shoe friction element which pivots independently of said carrier for radially outward movement into frictional engagement with the cylindrical braking surface, said carrier being operatively connected to said shoe friction element to cause it to pivot and thereby apply said shoe element against the cylindrical braking surface of said rotatable member, and means for mounting said carrier member adjacent the end of said shoe friction element to provide pivotal movement thereof on an axis located radially between the axis of rotation of said rotatable member and said oppositely facing friction elements.

10. In a brake, a single rotatable member provided with three braking surfaces, a fixed member, an arcuate self-energizing first friction element pivotally carried at the end thereof on said fixed member for radial movement into engagement with one of said braking surfaces, oppositely-facing parallel second friction elements arranged adjacent the other braking surfaces for axial movement thereagainst, a separate pivot for said second friction elements, means operatively connecting said first and second friction elements, a fluid motor, means for mounting said fluid motor radially inwardly from said three braking surfaces and secured to said fixed member, the axis of said motor being substantially parallel to the brake axis, said fluid motor being located in contiguous relation with said second friction elements, and a lever connecting said motor to said second friction elements.

11. In a brake, a single rotatable member having two plane and one cylindrical surfaces, a fixed member, a friction unit, means for mounting said friction unit radially inwardly from said plane and cylindrical surfaces and secured to said fixed member, said friction unit including oppositely-facing first friction elements axially movable in opposite directions for engagement with said plane surfaces which are located to be in closely spaced relationship therewith, and a second friction element substantially radially movable for engagement with said cylindrical surface, a fulcrum provided at the remote end of said second friction element said first friction element and said second friction element being operatively connected so that engagement between said first friction elements and said plane surfaces will cause substantially radial movement of said second friction member, a fluid motor mounted on said fixed member with the axis of the motor parallel to the brake axis and disposed radially inwardly from the plane and cylindrical surfaces of said rotatable member, means for pivoting said first friction element separately from said second friction element and a lever connecting said motor to said first friction elements to impart axial motion thereto for establishing engagement with said plane surfaces.

12. In a brake assembly, a rotatable member having three friction element engaging surfaces, oppositely-facing parallel disk friction elements, a shoe friction element operatively connected to said disk element, a fluid motor having a piston, a stationary member providing a support for said fluid motor and friction elements, a first lever connected to said piston, a second lever connected to said stationary member at a point along the axis of said fluid motor, and a link operatively connecting the levers, said levers being interconnected with said disk friction elements to introduce spreading thereof and to cause actuation of said shoe friction element upon energization of said fluid motor.

13. In a brake, a single rotatable member having parallel sides joined by a cylindrical side, a radially outwardly actuated shoe friction element engageable with said cylindrical side, disk friction elements one engageable with each of said parallel sides, a fluid motor provided with a movable member, a stationary member, and a pair of levers operatively interconnecting said disk friction elements and said movable and stationary members, said members providing a pivotal connection for said levers, said levers being connected to said members and to said disk friction elements to pivot in a plane parallel to two of the sides of said rotatable member as well as perpendicularly thereto.

References Cited in the file of this patent

UNITED STATES PATENTS

| | | |
|---|---|---|
| 1,876,265 | Tucker et al. | Sept. 6, 1932 |
| 1,928,630 | Penrose | Oct. 3, 1933 |
| 1,956,315 | Collins | Apr. 24, 1934 |
| 2,050,902 | Tatter | Aug. 11, 1936 |
| 2,065,382 | Levy | Dec. 22, 1936 |
| 2,359,788 | Pierce | Oct. 10, 1944 |
| 2,365,726 | Penrose | Dec. 26, 1944 |
| 2,602,525 | Jurgens | July 8, 1952 |
| 2,629,473 | Vincent | Feb. 24, 1953 |
| 2,751,046 | Tack | June 19, 1956 |

FOREIGN PATENTS

| | | |
|---|---|---|
| 741,611 | Germany | Mar. 23, 1953 |

UNITED STATES PATENT OFFICE
CERTIFICATE OF CORRECTION

Patent No. 2,927,663                               March 8, 1960

Richard T. Burnett

It is hereby certified that error appears in the printed specification of the above numbered patent requiring correction and that the said Letters Patent should read as corrected below.

Column 2, line 44, after "pistons" insert -- 58 --; line 67, for "35" read -- 34 --; column 5, line 21, after "member" insert a comma.

Signed and sealed this 8th day of November 1960.

(SEAL)

Attest:

KARL H. AXLINE
Attesting Officer

ROBERT C. WATSON
Commissioner of Patents